(12) United States Patent
McMann et al.

(10) Patent No.: US 7,275,684 B2
(45) Date of Patent: Oct. 2, 2007

(54) METHOD AND SYSTEM FOR CONSOLIDATING CASH LETTERS

(75) Inventors: David McMann, Garland, TX (US);
Robert Bean, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 371 days.

(21) Appl. No.: 10/904,931

(22) Filed: Dec. 6, 2004

(65) Prior Publication Data

US 2006/0118613 A1 Jun. 8, 2006

(51) Int. Cl.
*G07F 19/00* (2006.01)

(52) U.S. Cl. .................................. 235/379; 235/375
(58) Field of Classification Search ............... 235/379
See application file for complete search history.

(56) References Cited

U.S. PATENT DOCUMENTS

2006/0266819 A1* 11/2006 Sellen et al. ............... 235/379

* cited by examiner

*Primary Examiner*—Karl D. Frech
(74) *Attorney, Agent, or Firm*—Moore & Van Allen PLLC; Steven B. Phillips

(57) ABSTRACT

Method and system for consolidating cash letters. Embodiments of the invention provide methods and systems for consolidating cash letter data from a plurality of capture devices and sources. In example embodiments, data from multiple sites and sources can be assembled into a single, endpoint file for a specific clearing institution. The reformatting and distributing of this data can be accomplished using endpoint specific rules and specifications. In some embodiments, a transaction exchange (TRX) stores cash letter data according to a file key and applies the endpoint specific distribution controls to the data to create the specific endpoint files. The transaction exchange can take the form of a data warehouse with processing and storage capabilities necessary to sweep the appropriate cash letter data into an endpoint file as needed. An image archive can be provided to enable appending images to endpoint files.

30 Claims, 5 Drawing Sheets

METHOD AND SYSTEM FOR CONSOLIDATING CASH LETTERS

BACKGROUND OF INVENTION

Financial Institutions have established various processes and associations related to the exchange of documents evidencing monetary transactions. Some types of documents have been historically encoded with magnetic ink so that information from the documents can be read by machine. Such documents have thus become known as magnetic ink character recognition (MICR) documents. Historically, these documents have been at least theoretically presented by delivery of physical paper. However, many types of payments and transactions are no longer enabled by paper. Additionally, even with traditional checks, check presentment and clearing is no longer accomplished using the physical checks, even though paper checks may be still be shipped between banks for reconciliation.

For some time, posting of financial transactions to accounts at a clearing institution has been accomplished through the use of a "cash letter" which contains detailed data on all the transactions to be cleared. At one time, cash letters were paper documents, but in the modern banking system, an "electronic cash letter" (ECL) is typically used. An ECL file can also be referred to as an "electronic cash presentment" (ECP) file. ECP files are formatted according to accepted industry standards. ECP files can be sent directly between financial institutions, but they are also often sent through clearing agents or a centralized, government based banking system, for example, the Federal Reserve System in the United States. Reconciliation and error recovery based on paper documents is subject to numerous exceptions as a result of paper handling and due to late delivery of documents. Thus, legislation has been promulgated which has allows banks to completely eliminate paper documents and accomplish reconciliation and other processes using electronic images of checks and other documents. In some cases, an "image replacement document" (IRD) can be used as a substitute for an image. An IRD file is also formatted according to accepted industry standards.

In any case, large financial institutions must present millions of items each day to clearing financial institutions for posting. A large franchise often assembles cash letter data at various geographic and branch locations throughout its operation. Thus, a large institution will often send multiple ECL or ECP files, with or without images, to another large financial institution in a given day or other relevant time period. This occurs, for example, when each division or branch of a capture bank sends a file of cash letter information to the same clearing institution or paying bank.

SUMMARY OF INVENTION

Embodiments of the present invention provide methods and systems for consolidating cash letter data from a plurality of capture devices and sources in a banking or other financial enterprise. In example embodiments, data from multiple sites and sources can be assembled into a single, endpoint file for a specific clearing institution. The reformatting and distributing of this data can be accomplished using endpoint specific rules and specifications. In example embodiments, the endpoint file of cash letter data can take the form of an ECL or ECP file with or without appended images, or of an IRD file.

A method of consolidating cash letter data from a plurality of sources distributed within a financial enterprise can begin with the receiving of cash letter data from those distributed sources. Endpoint specific distribution controls are applied to the cash letter data to create an endpoint file for a specific clearing institution. The endpoint file can include the cash letter data from a variety of sources, where otherwise, a plurality of files might be sent to the clearing institution. The consolidated, endpoint file is then forwarded to the relevant clearing institution through normal channels, either directly or through a clearing house or agent. In some embodiments, the file includes images, which can be pulled from an existing image archive and appended to an ECL or ECP file. In some embodiments, the endpoint file can take the form of one or more image replacement document (IRD) files. Additionally, information can be stored within a system implementing an embodiment of the invention, to facilitate an endpoint specific "end-of-day" process. Such a process can include reconciliation, reporting, and hold-over processing.

In some embodiments, a system including the various means to implement processes according to the invention can include connectivity to receive the cash letter data from the various sources within an enterprise. A connection to send the endpoint files is also included. A transaction exchange (TRX) stores cash letter data and applies the endpoint specific distribution controls to the data to create the specific endpoint files. The transaction exchange can take the form of a data warehouse with processing and storage capabilities necessary to sweep the appropriate cash letter data into an endpoint file as needed. In at least some embodiments, an image archive is also functionally connected within the system to enable appending images to endpoint files.

In at least some embodiments, the transaction exchange or TRX warehouse includes an input stage which reformats incoming cash letter data according to specified input rules, an output stage that reformats the data according to output rules, and a core function, which stores the data and applies the endpoint specific distribution controls. In some embodiments the core stores the cash letter data in accordance with the file key that is updated during a sweep to apply the endpoint specific distribution controls. The file key can include a date field, a capture site identifier to specify sources of cash letter data from within the enterprise, and an identification number to specify a specific endpoint corresponding to a specific clearing institution. The file keys can be stored on a computer readable storage medium and serve as an index to the cash letter data. In some embodiments, an application code field initially specifies which application the data came from, and is updated to specify a cash letter application during a sweep. In some embodiments, a sweep number field which indicates the particular sweep operation in which distribution controls have been applied is inserted in place of a file number field during the sweep operation. Thus, the file key format can facilitate tracking, reporting, and end-of-day functions.

DETAILED DESCRIPTION

Figure 1:
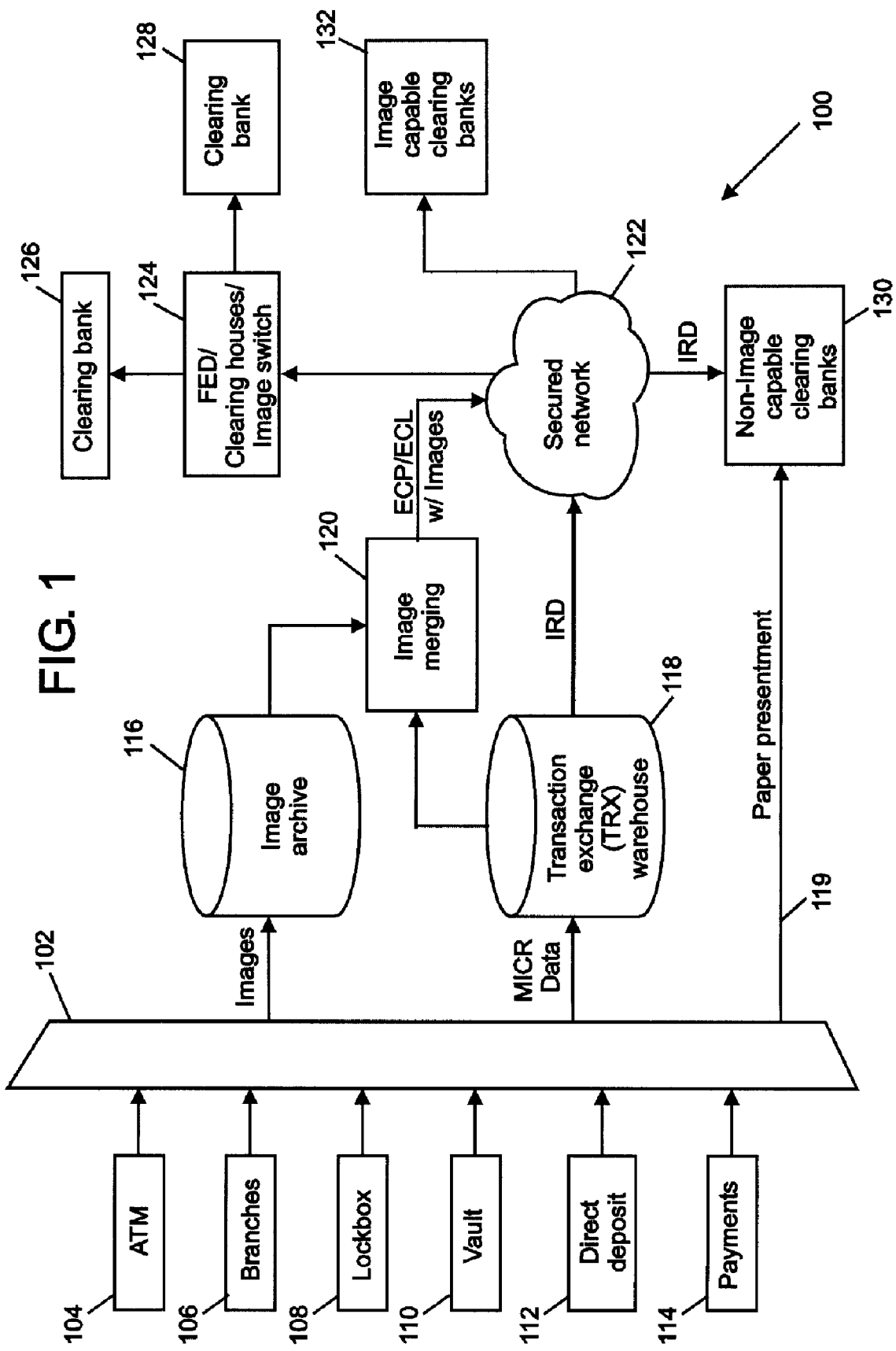
FIG. 1 is a functional block diagram that illustrates the system of the invention according to example embodiments.

The present invention will now be described in terms of specific, example embodiments. It is to be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. It should also be understood that throughout this disclosure, where a process or method is shown or described, steps of the method may be performed in any order or simultaneously, unless it is clear from the context that one step depends on another being performed first. Also, time lags and waiting intervals between various steps or sub-processes of a method can vary.

It may be helpful for the reader to understand some of the terminology used herein from the beginning. An appreciation of some of this terminology can best be garnered from an explanation of some basic banking processes and file formats. At various places throughout this disclosure, the term "cash letter" is used, either by itself or in combination with other terms. This terminology is intended to refer to information exchanged within the banking system to facilitate posting and clearing of payments between banks. Systems that handle such information are well known within the banking industry by those who work in the financial data processing fields. For example, MICR data is commonly stored in a system known as a "check image management system" (CIMS) and within a "check processing control system" (CPCS). This terminology refers to data processing systems that have been used historically by the banking industry. Through the use of such systems, checks and index information referring to the checks have typically been stored and managed.

In the modern banking system, cash letter data can include information on electronic payments, ATM transactions, direct deposits, and many other non-paper transactions. In a typical financial environment, cash letter data is stored in a file that can be communicated between banks. Such a file has historically been referred to in electronic cash letter (ECL) file. In some circles, it is also referred to as "electronic cash presentment" (ECP) file. Such files can include only data, or can include images and data. Such a file which includes images is sometimes referred to as an "image cash letter" (ICL) file, or an "image ECP," or "image ECL" file.

In the context of this disclosure, an "endpoint" is a specific place to which a file is sent for presentment, reconciliation, posting, or the like. In most cases, an endpoint corresponds to a clearing financial institution, such as a clearing bank, sometimes also referred to as a paying bank. A file of cash letter data that is sent to such an institution can be referred to as an endpoint file. An endpoint file may be an ECP or ECL file, either with or without images, an "image replacement document" (IRD) file, or any other type of file that serves the same or a similar purpose.

This disclosure makes reference to the control and monitoring of the distribution of endpoint files with "endpoint specific distribution controls" and the like. Such controls define file transmissions specifications, timing, locations, and other information that determines where, when, and how endpoint files are sent. These files may be described herein as being exchanged between banks, enterprises, institutions, or the like, but these terms are used herein in their broadest sense. Financial institutions that process transactions and documents of the types discussed, and thus exchange ECP and ECL files and the like, can include many different types of entities. For example, such institutions can include stock brokerages, credit unions, savings and loan institutions, retail institutions, service organizations, and even government institutions. The use of terms of such as "bank" or "financial institution" herein is meant to encompass all such possibilities.

FIG. 1 is a block diagram which illustrates system 100, which further provides an operating environment and the apparatus to implement an example embodiment of the invention. In FIG. 1, connectivity 102 provides an interface to various capture devices and other sources for the receipt of cash letter data from throughout a financial enterprise. Additionally, some of these sources of cash letter data could be located outside of the enterprise. A non-exhaustive set of potential sources of data is shown in FIG. 1 For example, data can come from automatic teller machine (ATM) networks 104, as well as other processes within bank branches 106. So-called "lockbox" systems 108 receive and process certain types of electronic payments. The moving a paper documents in and out of vault 110 might represent certain types of financial transactions which would result in cash letter data being generated. Direct deposits 112 can also result in data being generated. In addition, miscellaneous other types of payments, 114, can represent a source or sources for cash letter data.

Connectivity 102 of FIG. 1 is a schematic representation of existing systems which can include check sorters, large and small computer networks, data entry terminals, and the like. In many cases, paper documents are passed over optical scanners and electronic images are captured. Such images are forwarded to and stored in image archive 116. Additionally, detailed information about the transactions, both those represented by paper documents and other transactions, is forwarded to the transaction exchange (TRX) warehouse, 118. Such information typically includes check numbers, account numbers, routing and transit numbers which determine which bank is responsible for ultimately paying for an item, serial numbers, and the like. In financial system parlance this is all commonly referred to as MICR data, although more and more of such cash letter data originates through some process other than the reading of MICR data from paper documents. Finally, in system 100 of FIG. 1, connectivity 102 maintains the ability to provide paper presentment to banks and financial institutions that may not be capable of processing images, as shown by signal path 119.

In example embodiments of the invention, data from multiple sources destined for multiple endpoints is all collected in TRX warehouse 118. Distribution controls are applied to consolidate cash letter data from multiple sources into one, or at least a relatively small number, of endpoint files for a specific clearing institution. Thus, in some embodiments, it may be possible to send a single endpoint file to cover all or substantially all of the cash letter data gathered from a plurality of sources throughout an enterprise for a given time period. Endpoint files created in this fashion can be forwarded to an image merging process, 120. As needed, images are pulled from image archive 116 and appended to an endpoint file by image merging process 120. If images are not available, or not needed, an endpoint file might be sent directly to secured network 122 for eventual forwarding on to clearing banks and other institutions. In the example of FIG. 1, endpoint files with images take the form of ECP or ECL files, and endpoint files without images take the form of IRD files. An endpoint file passes through secured network 122 and is forwarded through a central bank, clearing house, or image switch, as shown at 124, or directly to clearing banks such as those the non-image-capable bank shown at 130 and the image-capable bank shown at 132. Where endpoint files are forwarded through a central bank or clearing house, they eventually reach clearing banks such as those shown at 126 and 128.

Secured network 122 may be implemented by a secured connection or "pipe" through a public network such as the Internet. Alternatively, a private network or banking specific network such as the automated clearing house (ACH) network may be used. Note that in the case of an endpoint file being forwarded directly to non-image capable clearing banks 130, the file can take the format of an IRD file and paper presentment follows. However, in the case of image capable clearing banks 132, an ECP or ECL file with images can be used.

Figure 2:
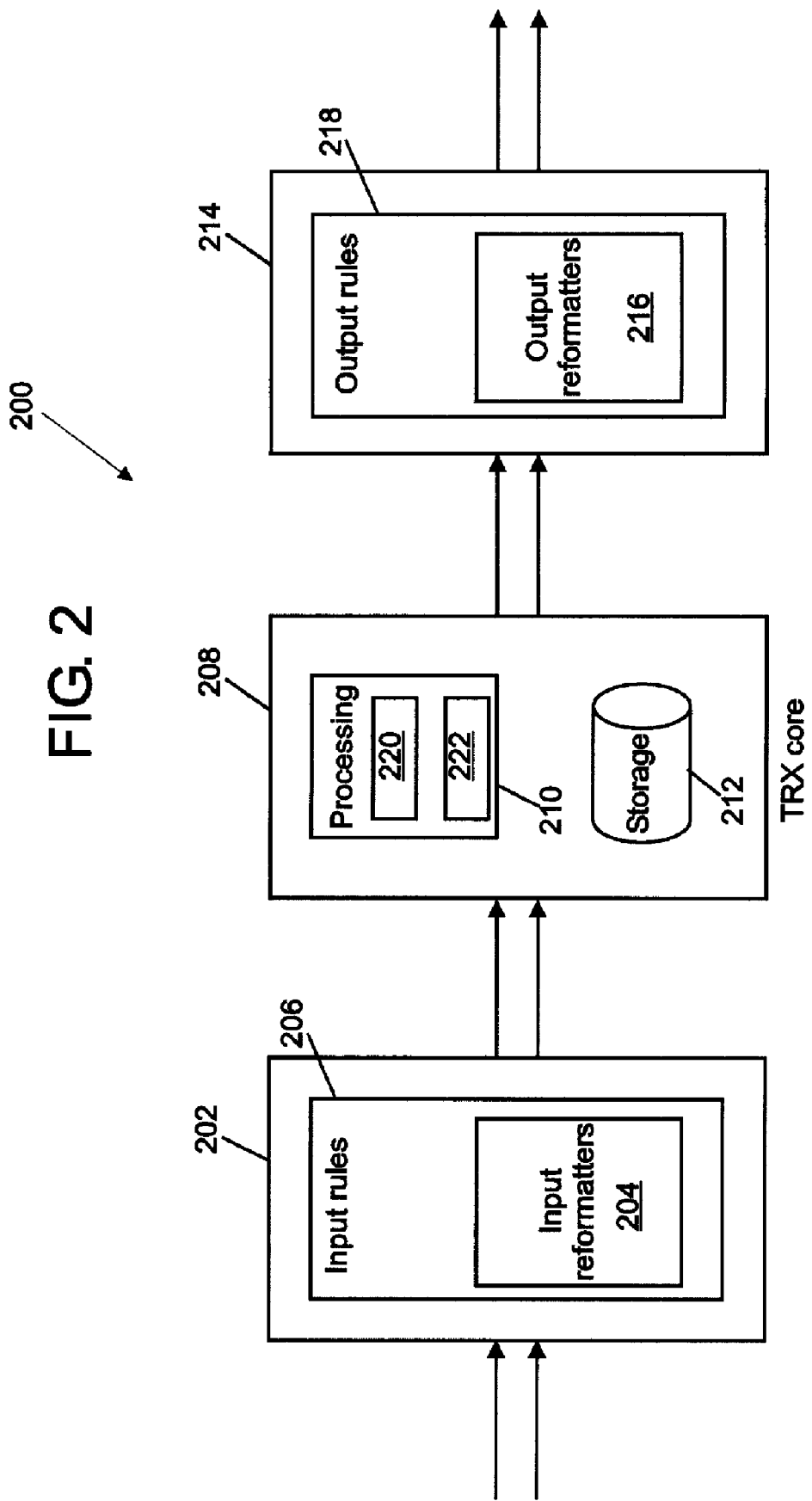
FIG. 2 is a more detailed block diagram of the transaction exchange warehouse shown in FIG. 1.

With reference to the TRX warehouse, 118, of FIG. 1, in the example embodiments discussed herein, TRX is a data repository that can be used as a processing platform to provide external applications with the ability to store, count, extract, and process transactions. TRX warehouse 118 can collect data in increments and distribute it in one distribution. TRX receives transactions from upstream systems, stores the transactions within a common repository, and distributes transactions. In example embodiments, the TRX warehouse is implemented by a computer platform with high availability and reliability. Such platforms are known in the art and can be based on many different types of operating systems. FIG. 2 provides a schematic block diagram that illustrates the structure of an example embodiment of the TRX warehouse. The TRX system, 200, includes input stage 202 which receives cash letter data from various sources. Input reformatters 204 format cash letter data for storage and indexing, according to input rules, 206. TRX core 208 includes processing functions 210 and storage 212. TRX output stage 214 includes output reformatters, which reformat data from the TRX core to be output according to output rules 218. In example embodiments, data flows through TRX system 200 of FIG. 2 in the direction of the arrows. Data can have multiple paths within the system.

Storage 212 of FIG. 2 is a repository for cash letter data that is being processed in the manor of embodiments of the invention. Storage 212 also provides a computer readable storage medium or storage media where file keys are stored. The file keys are used to refer to and index cash letter data so that it can be assembled into endpoint files. In some embodiments, processing 210 includes sweep engine 220 that continuously analyzes input, using dispatch rules, and cues it for the application of endpoint specific distribution controls so that the data can be output from the system. Processing 210 also can include distribution engine 222 that continuously analyses data to be output into endpoint files, and creates image cash letters, IRD's, or other types of endpoint files to be forwarded to appropriate clearing institutions. Input reformatters 204 and input rules 206 of input stage 202, provide processing to deal with various disparate types of data that are received by TRX system 200 as input. Thus, in some embodiments, a plurality of reformatters are included, each one for a specific application. For example, a reformatter may be directed to formatting ACH transactions, another to ATM transactions, and another directed to formatting data from paper input such as input received from CPCS and/or CIMS.

Output rules 218 direct output reformatters 216 to format endpoint files according to requirements of specific clearing institutions. For example, different clearing houses and banks may have different requirements for file formats. The Federal Reserve Bank of the United States may have one requirement that differs from the requirements of, for example, the banking system used by the U.S. Military, or the requirements of a specific clearing house. Additionally, float options and holdover requirements may be specified as part of some endpoint file formats.

Figure 3:
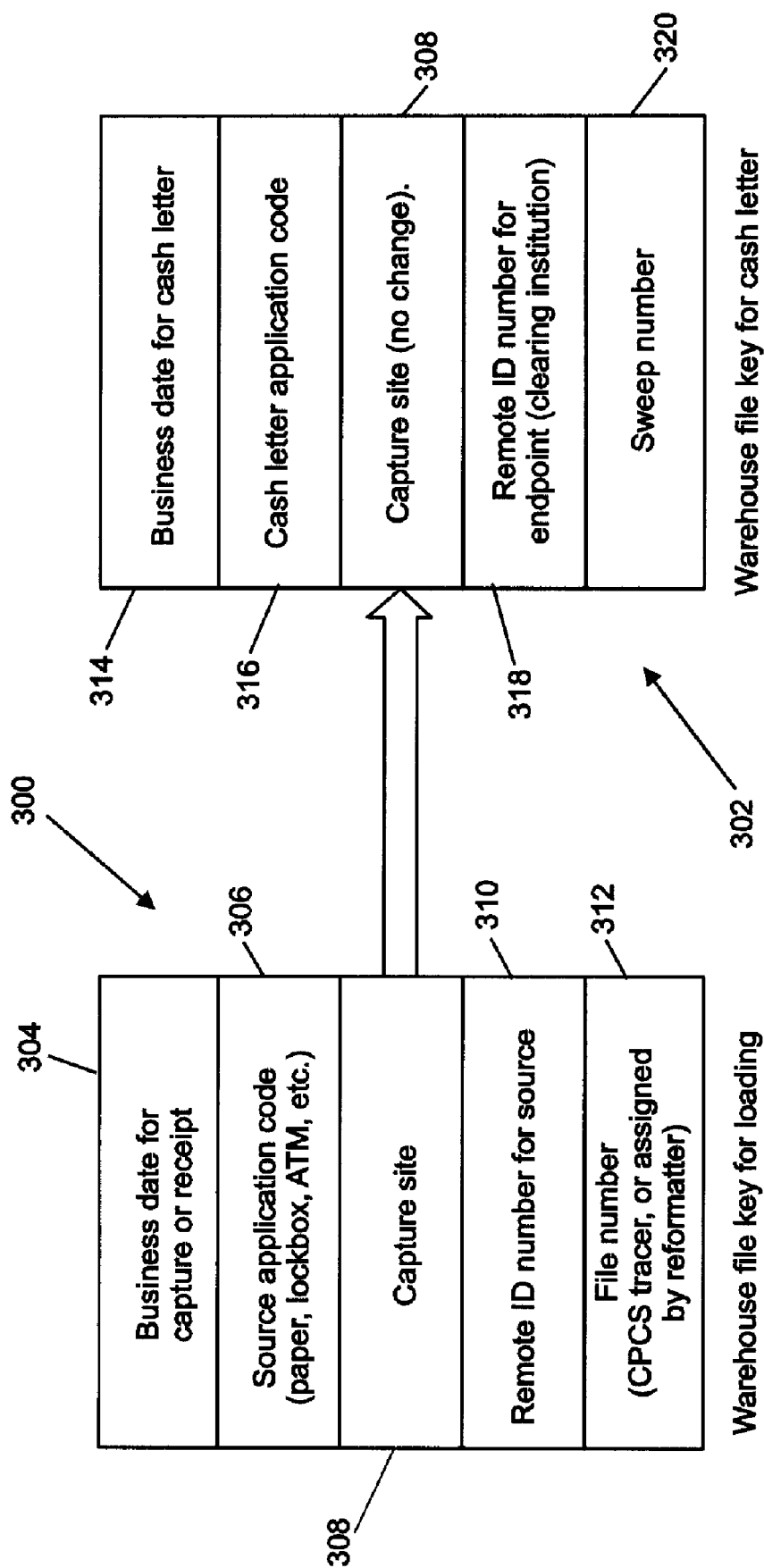
FIG. 3 is a data structure diagram which illustrates an example embodiment of a warehouse file key structure, and shows how that structure is updated in the process of consolidating cash letter data for an endpoint file.

FIG. 3 is a block diagram illustrating file key formats that can be used to manage the storage of data within the TRX warehouse according to some embodiments of the invention. File keys enable the storage and retrieval of cash letter data, and can be stored on a computer readable storage medium either with the data or separately. Warehouse file key 300 identifies files as they are loaded from upstream sources. Such a warehouse file key is converted to a warehouse key for cash letter data, 302, during a sweep process. Date field 304 of warehouse file key 300 designates the business date of capture or receipt of the cash letter data being referenced. Application code field 306 identifies the source application from which the cash letter data of interest was received. For example, paper sorters, the lockbox, etc. Field 308 specifies a capture site identifier. Remote identifier (ID) field 310 further specifies the source of the data. For example, it may further define the source down to a specific sorter or platform. File number field 312 of warehouse file key 300 is a file number which identifies the cash letter data itself. For data received from CIMS or CPCS, this number may be the CPCS tracer number. For other sources, a number can be assigned by the reformatter for each entry that is loaded into the warehouse. In example embodiments, data can be pulled from the warehouse using warehouse file key 300, if data should need to be pulled prior to being included in an outgoing cash letter file. Individual files of cash letter data in such cases can be pulled using the business date, an application code, capture site, or any other parameter.

According to example embodiments of the invention, warehouse file key 300 is updated and re-stored during a sweep as a warehouse file key, 302, to be used for a cash letter endpoint file for a specific clearing institution. During a sweep, the business date field is updated to field 314, which is the date of the cash letter of interest. The application code field is updated to application code field 316, which now specifies a cash letter as the application. Capture site field 308 is unchanged. Remote identification field 310 is updated to remote identification field 318, which now specifies an endpoint number representing the clearing institution where the cash letter is going. Finally, file number field 312 is updated to sweep number field 320, which identifies the specific sweep which applied distribution controls to create the cash letter endpoint file.

In example embodiments, sweep field 320 of FIG. 3 contains a time code which identifies when the sweep took place, and a type code which specifies the type of endpoint file being created. In some embodiments, for example, a value of "0" in the type field can designate the endpoint file as a normal cash letter file. A value of "1" for a type code can signify work from the next cycled cash letter. A field value of "2" can signify late work from a current cycle cash letter as of the next business day. A type field value of "3" can be used to identify work from the next cycle that is late and will be cash lettered this day. Additional values can be specified, and the types of cash letter files created can be chosen and managed on an endpoint specific basis, according to clearing institution preferences. In example embodiments, the file keys enable cash letter data to be stored as a queued sequential access method (QSAM) directory with a file key being an address pointer to blocks of data.

Figure 4:
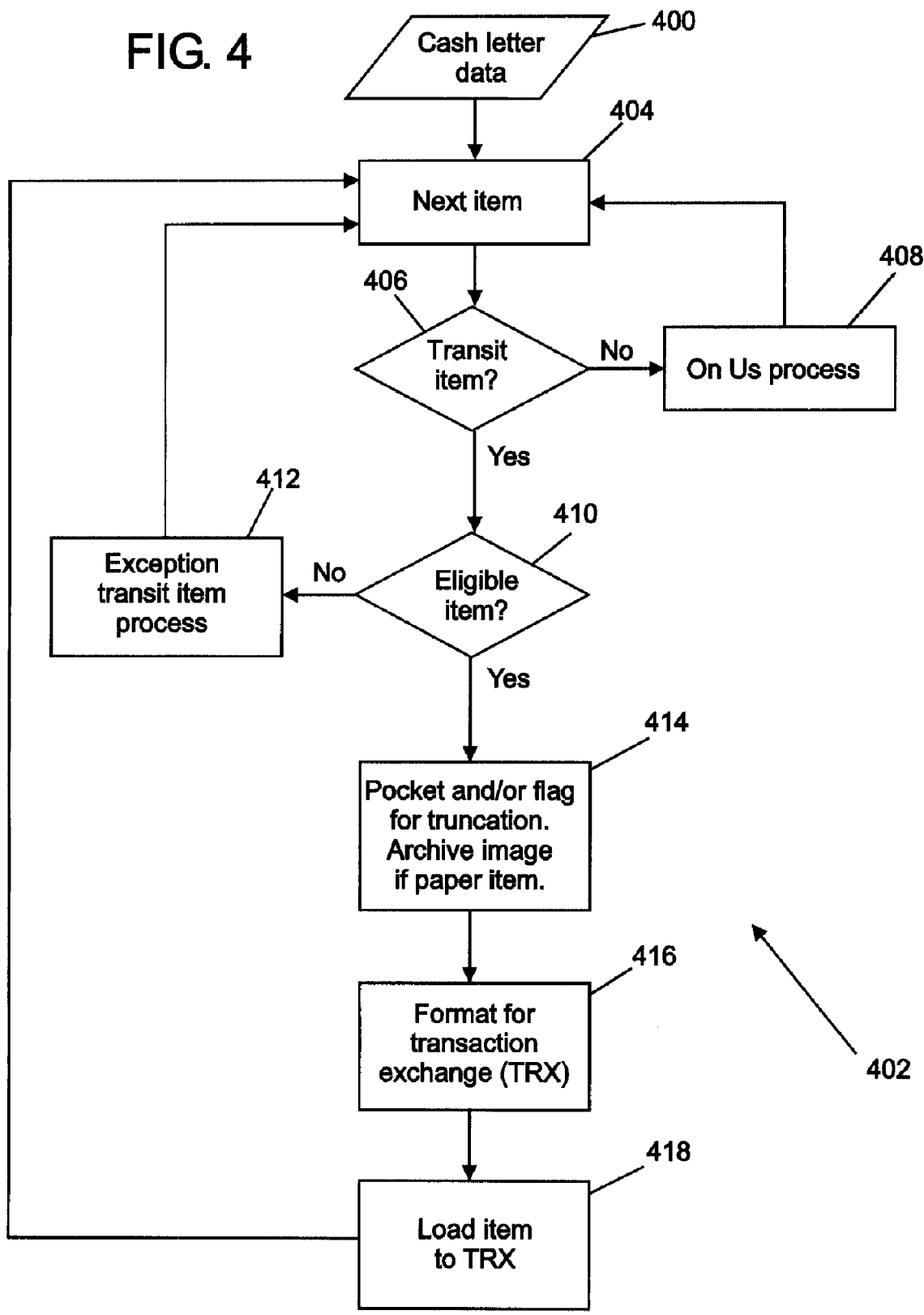
FIG. 4 is a flowchart which illustrates a method according to example embodiments of the invention.

FIG. 4 illustrates an example process by which cash letter data from specific items is captured and stored in the TRX warehouse according to at least some embodiments of the invention. FIG. 4 illustrates the process in flowchart form. Like most flowcharts, the process is illustrated as a series of process blocks. Cash letter data 400 serves as an input for process 402. At block 404, the data for an item is examined. At block 406, a determination is made as to whether the particular item is a transit item. Items processed by financial institution are typically "on us" items or "transit" items. An on us item is an item that is drawn on the financial institution doing the processing. On us items are typically forwarded to other locations within the financial institution's own franchise, and thus are not transmitted elsewhere via a cash letter process. Transit items are checks or other items drawn on other financial institutions, and are subject to delivery in some fashion to those other institutions, for example, via an image cash letter. It should be noted however, that the processes and systems described herein could be used within a financial institution if there were a desire to transfer files of such data to endpoints within the franchise.

Returning to block 406 of FIG. 4, if an item is not a transit item, it is handled with an on us process, 408, and processing returns to block 404. If it is a transit item at block 406, processing then proceeds to block 410, where another check is made as to whether the item is eligible for the cash letter consolidation process described herein. If the item is not eligible in this example embodiment, its data is processed according to an exception transit item process as shown at block 412. An item may not be eligible for the cash letter process described herein for a variety of reasons, which can vary from institution to institution. Certain accounts as specified by specific routing and transit numbers may be exempt from the process because special handling is required for those accounts. Items may be ineligible because of errors when data is read from the item, image quality problems, or other processing difficulties. In any case, if an item is identified as eligible at block 410, processing proceeds to block 414, where a physical item will be pocketed for truncation or a non-physical item may be flagged for "truncation" in accordance with the processes of embodiments of the invention. "Truncation" refers to the process whereby the forwarding of paper items is "truncated" and processing proceeds with electronic data. If a physical or paper item is being processed at block 414, the image can also be archived at this point.

At block 416 item data is formatted for the transaction exchange. In example embodiments, this is accomplished via the input reformatters and input rules previously discussed with respect to FIG. 2. Finally, data for the current item being processed is loaded into the TRX warehouse at block 418, and processing branches back to block 404 so the next item's data can be handled.

Figure 5:
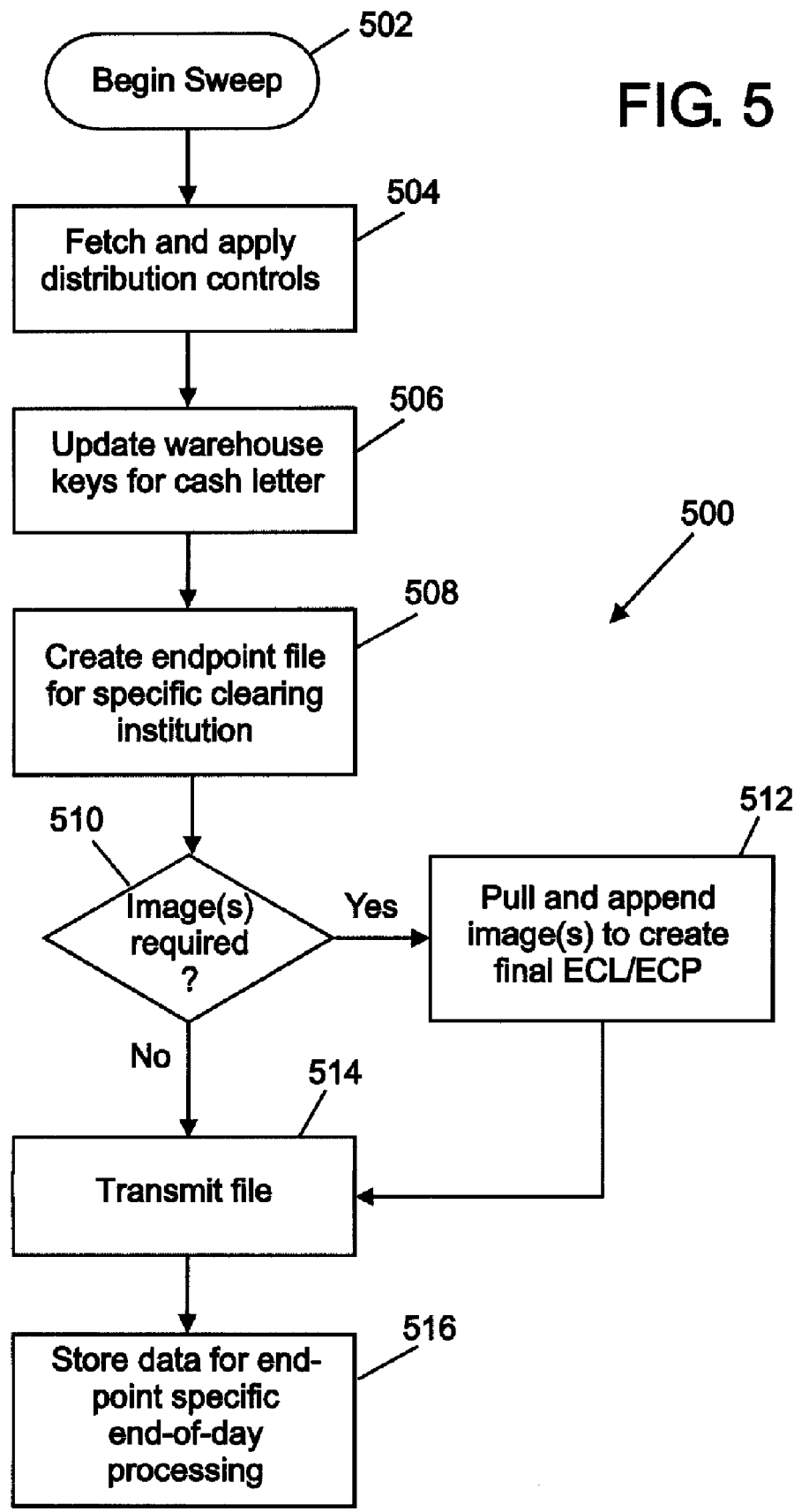
FIG. 5 is an additional flowchart which illustrates another method according to example embodiments of the invention.

FIG. 5 is another flowchart type diagram illustrating an example process, 500, for sweeping through cash letter data stored in the transaction exchange and applying endpoint specific controls in order to create a consolidated, endpoint, cash letter file. Again, process 500 of FIG. 5 is illustrated as a series of process blocks. A sweep begins at block 502. The system can be set up so that sweeps occur at regular time intervals, when a certain amount of data is amassed, or any other triggering mechanism that can be devised by those of ordinary skill in the art. At block 504 distribution controls are fetched from storage and applied to the data. At block 506 warehouse keys are updated to convert warehouse file keys for loading data into warehouse file keys for the cash letter. These warehouse file keys were previously described and discussed, and are illustrated in FIG. 3. At block 508, an endpoint file is created for a specific clearing institution.

At block 510 of FIG. 5, a check is made as to whether and which images are required to be forwarded with the cash letter data in the endpoint file. Whether an image is required for a specific transaction record is dependent on many factors. For example, this requirement may be endpoint specific, or it may depend on whether a particular record represents a paper item or an electronic transaction. For records which require images, images are pulled and appended to the endpoint file at block 512. In example embodiments, this creates an endpoint file that is either an ECL or ECP file with images. At block 514, the endpoint file is transmitted. At block 516, various summary information and/or other data is stored to provide for end-of-day processing.

"End-of-day" processing can include various items and procedures to insure that the process has worked correctly for consolidated cash letters which have been forwarded during a specific time period, such as a business day. This processing can include the provision for receiving and reconciling acknowledgements from clearing institutions, storing cash letter summary information for future reference, and tabulating statistics regarding cash letter traffic. End-of-day processing can be flexible by endpoint, in a similar fashion to many of the other sub-processes and elements of embodiments of the invention. End-of-day processing can include balancing with item processing within the institution and carry over work. It may also include research reporting. Provisions can be made to document incidents where some cash letters could not be sent for one reason or another, and to automate the sending of such a cash letter for the next business cycle.

End-of-day processing can also handle situations that come about because cash letter processing today must acknowledge the deadlines of financial institutions for receiving cash letters. When an endpoint's deadline is passed a cash letter for that endpoint will go out the next day. Embodiments of the invention disclosed herein can handle this situation by creating an internal file number for the cash letter. In example embodiments, the internal file number can take the form of "Xhhmm" where "hhmm" is the sweep time in hours and minutes. The "X" can take on a value that provides for unique reporting and identification based on the way the cash letter is stored in the TRX warehouse. The distribution process can further use this scheme to separate business days. In at least one example embodiment of the invention, the value of "X" can be: "0" to indicate a current business day cash letter captured from the current day CPCS cycle; "1" to indicate a current business day cash letter captured from the advanced business day cycle; "2" to indicate a next business day cash letter captured from the current business day business cycle (a carryover); or "3" to indicate a next business day cash letter captured from the next business day business cycle but on the current business day.

It should be noted that in many embodiments, the invention is implemented by database systems, computer systems, and interconnected network facilities, all being operated according to stored programs, databases, and data structures. FIG. 1 provides an example of a system and network architecture that can be used to implement an example embodiment of the invention. However, one or ordinary skill in the computing, networking, and financial arts will quickly recognize that the invention can find use in other environments. In fact, many embodiments and implementations of the invention are possible, in which varied means of computer hardware and software are used to establish necessary data structures and carry out the various subprocesses and elements of the invention. The following claims are in no way intended to limit the scope of the invention to the specific embodiments described.

What is claimed is:

1. A method of consolidating cash letter data for distribution to a specific clearing institution, the method comprising:
   receiving the cash letter data from a plurality of sources;
   applying endpoint specific distribution controls to the cash letter data to create an endpoint file for the specific clearing institution, the endpoint file including at least some of the cash letter data; and
   sending the endpoint file to the specific clearing institution.

2. The method of claim 1 further comprising appending at least one image to the endpoint file prior to sending the endpoint file.

3. The method of claim 2 wherein the endpoint file is one of:
   an electronic cash presentment (ECP) file; and
   an electronic cash letter (ECL) file.

4. The method of claim 3 further comprising storing information to accommodate an endpoint specific end-of-day process.

5. The method of claim 2 further comprising storing information to accommodate an endpoint specific end-of-day process.

6. The method of claim 1 wherein the endpoint file is an image replacement document (IRD).

7. The method of claim 6 further comprising forwarding paper documents corresponding to the cash letter data to the specific clearing institution.

8. The method of claim 5 further comprising storing information to accommodate an endpoint specific end-of-day process.

9. The method of claim 4 further comprising storing information to accommodate an endpoint specific end-of-day process.

10. The method of claim 1 further comprising storing information to accommodate an endpoint specific end-of-day process.

11. Apparatus for consolidating cash letter data for distribution to clearing institutions, the apparatus comprising:
   means for receiving the cash letter data from a plurality of sources;
   means for applying endpoint specific distribution controls to the cash letter data to create an endpoint file for a specific clearing institution, the endpoint file including at least some of the cash letter data; and
   means for sending the endpoint file to the specific clearing institution.

12. The apparatus of claim 11 further comprising means for appending images to the endpoint file.

13. The apparatus of claim 12 further comprising means for storing information to accommodate an endpoint specific end-of-day process.

14. The apparatus of claim 11 further comprising means for forwarding paper documents corresponding to the cash letter data to the specific clearing institution.

15. The apparatus of claim 14 further comprising means for storing information to accommodate an endpoint specific end-of-day process.

16. The apparatus of claim 11 further comprising means for storing information to accommodate an endpoint specific end-of-day process.

17. A system for consolidating cash letter data for distribution to clearing institutions, the system comprising:
   connectivity to receive the cash letter data from a plurality of sources;
   a connection to send endpoint files including at least some of the cash letter data to the clearing institutions; and
   a transaction exchange (TRX) to store cash letter data and to apply endpoint specific distribution controls to the cash letter data to create a specific endpoint file for a specific clearing institution.

18. The system of claim 17 further comprising an image archive functionally connected to the system to enable appending images to endpoint files.

19. The system of claim 18 wherein the TRX further comprises:
   an input stage to reformat the cash letter data according to input rules;
   a TRX core to store the cash letter data and to apply the endpoint specific distribution controls; and
   an output stage to reformat the cash letter data according to output rules.

20. The system of claim 19 wherein the TRX core can store the cash letter data in accordance with a file key that can be updated during a sweep wherein the endpoint specific distribution controls are applied.

21. The system of claim 17 wherein the TRX further comprises:
   an input stage to reformat the cash letter data according to input rules;
   a TRX core to store the cash letter data and to apply the endpoint specific distribution controls; and
   an output stage to reformat the cash letter data according to output rules.

22. The system of claim 21 wherein the TRX core can store the cash letter data in accordance with a file key that can be updated during a sweep wherein the endpoint specific distribution controls are applied.

23. A computer readable storage medium encoded with a file key to enable the sending of a consolidated cash letter, the file key further comprising:
   a date field;
   a capture site identifier field to identify at least one source of cash letter data from among a plurality of sources;
   an identification (ID) number field to identify a specific endpoint corresponding to a specific clearing institution; and
   a sweep number field corresponding to a sweep operation in which endpoint specific distribution controls are applied to the cash letter data to create an endpoint file.

24. The computer readable storage medium of claim 23 wherein the file key further comprises an application code field.

25. The computer readable storage medium of claim 24 wherein the ID number field is updated from identifying a source of the cash letter data to identifying the specific endpoint, and the application code field is updated from identifying a source application to identifying a cash letter application.

26. The computer readable storage medium of claim 25 wherein the sweep number field replaces a file number field.

27. The computer readable storage medium of claim 24 wherein the sweep number field replaces a file number field.

28. The computer readable storage medium of claim 23 wherein the ID number field is updated from identifying a source of the cash letter data to identifying the specific endpoint.

29. The computer readable storage medium of claim 28 wherein the sweep number field replaces a file number field.

30. The computer readable storage medium of claim 23 wherein the sweep number field replaces a file number field.

\* \* \* \* \*

UNITED STATES PATENT AND TRADEMARK OFFICE
CERTIFICATE OF CORRECTION

PATENT NO. : 7,275,684 B2 Page 1 of 1
APPLICATION NO. : 10/904931
DATED : October 2, 2007
INVENTOR(S) : David McMann et al.

It is certified that error appears in the above-identified patent and that said Letters Patent is hereby corrected as shown below:

Col. 9, Claim 8, line 41, change "5" to --7--;

Col. 9, Claim 9, line 44, change "4" to --6--; and

Col. 10, Claim 21, line 32, change "17" to --18--.

Signed and Sealed this

Twentieth Day of May, 2008

JON W. DUDAS
*Director of the United States Patent and Trademark Office*